United States Patent [19]
Fannin et al.

[11] Patent Number: 4,724,937
[45] Date of Patent: Feb. 16, 1988

[54] HYDRAULIC DAMPER FOR VEHICLES WITH VARIABLE DEFLECTED DISK PISTON VALVING

[75] Inventors: Wayne V. Fannin, Xenia; Harry C. Buchanan, Jr., Spring Valley, both of Ohio

[73] Assignee: General Motors Corporation, Detroit, Mich.

[21] Appl. No.: 924,130

[22] Filed: Oct. 29, 1986

Related U.S. Application Data

[63] Continuation of Ser. No. 820,284, Jan. 17, 1986, abandoned, which is a continuation of Ser. No. 646,843, Sep. 4, 1984, abandoned.

[51] Int. Cl.⁴ .................................................. F16F 9/44
[52] U.S. Cl. ................................ 188/319; 137/493.8; 137/512.15; 188/322.15; 280/714
[58] Field of Search .......... 188/319, 299, 285, 322.15, 188/282, 317; 137/493.8, 493.9, 512.15, 824; 280/715

[56] References Cited

U.S. PATENT DOCUMENTS

| | | | |
|---|---|---|---|
| 1,205,433 | 11/1916 | Christman | 188/319 |
| 1,810,233 | 6/1931 | Walden | 188/319 |
| 2,950,785 | 8/1960 | Patriquin | 188/319 |
| 3,134,460 | 5/1964 | De Carban | 137/512.15 X |
| 3,265,085 | 8/1966 | Koehler | 137/512.15 |
| 3,420,341 | 1/1969 | Keehn, II | 188/319 |
| 3,528,531 | 9/1970 | Schweller et al. | 188/319 |
| 3,827,538 | 8/1974 | Morgan | 188/319 |
| 3,945,474 | 3/1976 | Palmer | 188/322.15 |
| 4,183,509 | 1/1980 | Nishikawa et al. | 188/319 X |
| 4,298,102 | 11/1981 | Nishikawa et al. | 188/319 |
| 4,337,850 | 7/1982 | Shiwokura | 188/319 |

FOREIGN PATENT DOCUMENTS 951693 10/1956 Fed. Rep. of Germany ........................ 188/322.15

*Primary Examiner*—George E. A. Halvosa
*Attorney, Agent, or Firm*—Charles R. White

[57] ABSTRACT

Rebound damping action of this hydraulic damper is set by rotating a selector plate within the shock absorber piston to a number of positions to control orifice selection degree of disk plate pack deflection and the rate of oil flow through the piston during rebound.

2 Claims, 8 Drawing Figures

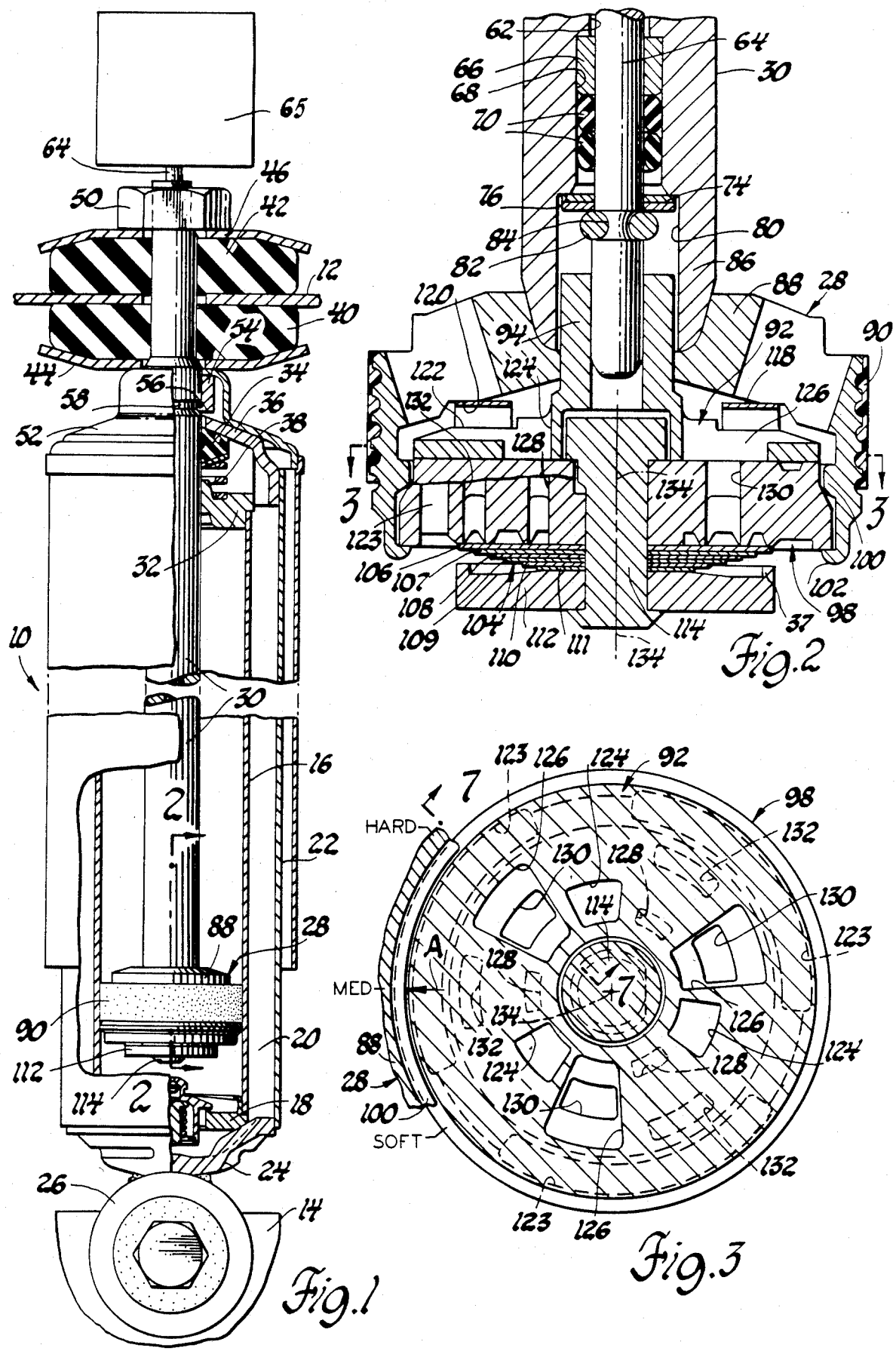

HYDRAULIC DAMPER FOR VEHICLES WITH VARIABLE DEFLECTED DISK PISTON VALVING

This is a continuation of application Ser. No. 820,284, filed on Jan. 17, 1986, which is a continuation of application Ser. No. 646,843, filed Sept. 4,1984, both now abandoned.

This invention relates to hydraulic dampers with selectively variable damping resistance for controlling suspension spring action and ride motions of vehicles and more particularly to a new and improved damper having deflectable disk valving in the piston thereof selectively controlled for setting damping characteristics.

Prior to the present invention, various hydraulic dampers, i.e. shock absorbers and struts have been engineered with selectively variable orificing to control oil flow through the piston as it strokes in the cylinder tube to thereby control the action of the vehicle suspension springs associated therewith. Generally such dampers involve costly and relataively complex blow off valving and controls and are not suitable for quantity production. In contrast to such prior dampers, the present invention provides new and improved deflected valve and valve control system for hydraulic which eliminates the complexities and costs of prior variable damper units and provides improved and precisioned control of fluid flow through the shock absorber piston of the damper.

More particularly this invention provides a new and improved piston assembly for a hydraulic damper incorporating a rotatable selector plate mounted on a fixed orifice plate. The selector plate is movable in response to controls to various rotated positions to select orifice size and radial position of the orificing from a center to control the fluid force and resultant amount of deflection of a spring disk pack mounted beneath the orifice plate. With such construction, hydraulic damping characteristics are varied and selected for controlling piston velocity and suspension spring damping during rebound. Importantly the resultant amount of deflection of a spring disk pack mounted beneath the orifice plate may be predetermined to control fluid flow through the piston. With such construction, hydraulic damping characteristics are varied and selected for controlling piston velocity and suspension spring damping during rebound. In a preferred embodiment of this invention, orifice plate rotation is externally controlled through a rotatable shaft extending through the piston rod from an external actuator which may be motorized. If desired, the shaft can be rotated by internal motor or actuator. In a preferred embodiment of this invention, certain orificing adjacent to the center of the valve spring disk pack may be selected so that orifice opening is optimized and close to the anchor or fulcrum point of the spring disk pack. With this orifice selection, the disk pack deflection is low and the flow restriction through the piston is maximized and resistance to piston movement is high in the rebound mode of operation. This reduces piston velocities and provides for stiffer or harder ride characteristics that may be desired under certain vehicle operating conditions such as high speed cornering. When rotated to a second or intermediate position, the orifice size is optimized for medium or intermediate damping action. This is achieved by moving the open orifices further from the fulcrum point so that plate deflection may be increased and flow through the piston is increased. Under such intermediate condition, the resistance of the fluid within the damper to piston stroking in rebound is reduced. With reduced resistance, piston velocity increased and the ride is resultantly softer.

In a third position or setting, the orifice size is optimized for soft ride and moved further from the center or fulcrum of the disk pack. Under such conditions, the fluid forces on the spring disk pack will be further from the center and effect deflection of the disk pack so that spring damping characteristics of the shock absorber are reduced. If even softer rides are desired, the number, location and size of the orifices can be engineered to provide for additional flow through the piston with accompanying deflection of the spring disk pack.

With these selected orifice settings, the damper converts rebound motions into heat at selected rates so that road bumps are cushioned as desired by the vehicle operator. If desired deflection of the spring disk pack can be the same for all settings, the flow can be controlled by the amount of spring deflection, the size and radius of the orifices from the center and the curvature of the backing plate for the spring disk pack.

These and other features, objects and advantages of this invention will be more apparent from the following detailed description and drawing in which:

FIG. 1 is an elevational view partially in cross-section of a hydraulic damper according to this invention.

FIG. 2 is a cross-sectional view taken generally along sight lines 2—2 of FIG. 1 to show the valving of the piston assembly of this invention.

FIG. 3 is a cross-sectional view taken along sight lines 3—3 of FIG. 2 to show the selector plate and orifice plate relatively rotated to one of a plurality of operating positions for controlling fluid flow through the piston assembly during rebound.

Figure 4:
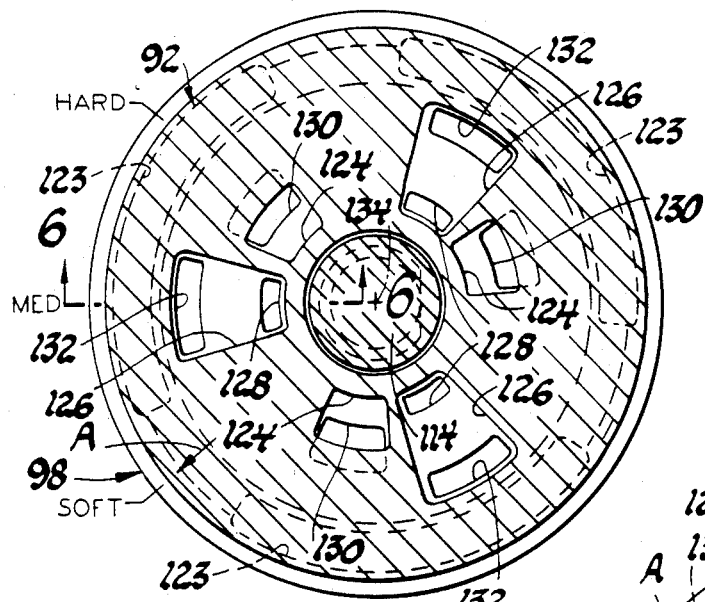
FIGS. 4 and 5 are views similar to that of FIG. 3 to show additional relatively rotated position of the piston and orifice plates of this invention to change the spring damping characteristics of the damper.

Turning now in greater detail to the drawings, there is shown in FIG. 1 a hydraulic, double-acting damper 10 operatively mounted between sprung and unsprung components of the vehicle here represented by an upper support plate 12 connected to the vehicle bodywork and a lower control arm 14 which is mounted to a steering knuckle and road wheel assembly. The damper 10 incorporates an elongated cylinder tube 16 having a conventional base valve 18 secured in the lower end thereof which controls the passage of oil between the cylinder tube and a surrounding oil reservoir 20 formed between the cylinder tube and the reservoir tube. The reservoir tube 22 is closed at its lower end by a base cup 24 on which the base valve 18 is seated. A lower mount 26 welded to the exterior of the base cup provides the connection to the control arm 14. A valved piston assembly 28 and connected piston rod 30 are operatively mounted for linear stroking movement in the cylinder tube during shock absorber operation. Piston rod 30 extends upwardly from the piston assembly 28 through a conventional rod guide 32 mounted in the upper end of the cylinder tube. The piston rod further extends through an annular elastomeric seal 34 and through a cup-like seal cover 36 whose peripheral flange fits into and is welded to the upper end of the reservoir tube 22. A helical spring 38 seated on the rod guide and around the piston rod yieldably holds the seal against the inner surface of the seal cover 36. The upper end of piston rod 30 extends through a pair of elastomeric mounting disk 40, 42 and the surrounding backing plates 44, 46 disposed on opposite sides thereof to sandwich the support plate therebetween with action of nut 50 threadedly received on the end of the piston rod.

A cup-like upper cover plate 52 through which piston rod 30 extends is connected to the piston rod immediately below backing plate 44 by a cylindrical retainer 54 and a cooperating snap ring 56 received in a groove 58 in rod 20. The elastomer mounting disks 40, 42 being effectively trapped between the upper and lower plates 46, 44 isolate the piston rod from the vehicle body. The piston rod 30 has a central bore 62 for receiving an elongated actuator rod or shaft 64 that extends therethrough.

The actuator rod, driven by suitable motor 65, is operatively connected to valving in the piston assembly described below. As shown, this rod is rotatably mounted in a cylindrical bearing 66 which is press-fitted within a small diameter counterbore 68 in the lower end of piston rod 30. O-ring seals 70 fitted on the actuator rod 64 below bearing 66 contact the walls of the counterbore to block the passage of shock absorber oil through the central bore 62 to the exterior of the damper. The actuator rod is retained in the central bore 62 of the piston rod by washers 74 seated against end walls 76 of a larger diameter counterbore 80 formed in the piston rod 30 and by a stop ring 82 fitted into a transverse annular groove 84 in the actuator rod 64 at the bottom side of washer 74. With such construction, the rod 64 cannot inadvertently be withdrawn from the piston rod 30.

The inner end 86 of piston rod 30 is welded or otherwise fastened to a cylindrical shell-like main body 88 of the piston assembly 28. This main body is peripherally bounded by a skirt 90 of Teflon or other suitable plastics material providing low friction sliding engagement with the inner wall of the cylinder tube 16. Mounted for axial rotational movement within the confines of main body 88 of the piston assembly 28 is a rotatable disk-like orifice selector plate 92 having an upstanding neck 94 received in the end of a large diameter counterbore 80 in the lower end of piston rod 30. In addition to the rotatable orifice selector plate 92, the main body 88 of piston assembly 28 houses a cylindrical, relatively thick, fixed orifice plate 98 that interfaces with the lower surface of the orifice selector plate 92. The orifice plate is peripherally secured therein between an inner locator ring 100 and an inwardly coined lower annular end 102 of main body 88. A valve spring disk pack 104 comprised of a series of flat washer-like valve disks 106, 107, 108, 109, 110 and 111 of spring steel having decreasing diameter, top to bottom, is mounted adjacent to the orifice plate to deflect downwardly to different positions in responses to the forces of jets of hydraulic fluid thereon in rebound stroke to thereby control fluid flow through the selector plate and orifice plates as further described below. The spring disk pack 104 is held in operative position between a contoured fulcrum or backing plate 112 and the orifice plate 98 by a centralized rivet 114 as shown in FIG. 2.

The selector plate 92 is rotatably mounted within the cavity of the main body 88. An annular wavy return spring 118 operatively mounted between the inner surface 120 forming the top of the cavity of the main body and the upper surface 122 of the selector plate 92 biases the selector plate into engagement with the orifice plate under certain operating conditions. On compression stroke, the selector plate is forced upwardly against the bias of the spring so that oil can flow through the piston via outer orifices 123 for checking jounce or compression stroke.

The selector plate 92 has first and second sets of three arcuately spaced and radially extending openings or windows 124 and 126 therethrough for controlling the flow of shock absorber fluid through first, second and third sets of orifices 128, 130, 132 formed in the orifice plate. The first set of orifices 128 are located at the smallest radial distance from the center 134 of the orifice plate while the second and third sets are respectively located at larger radial distances from center 134.

Figure 6:
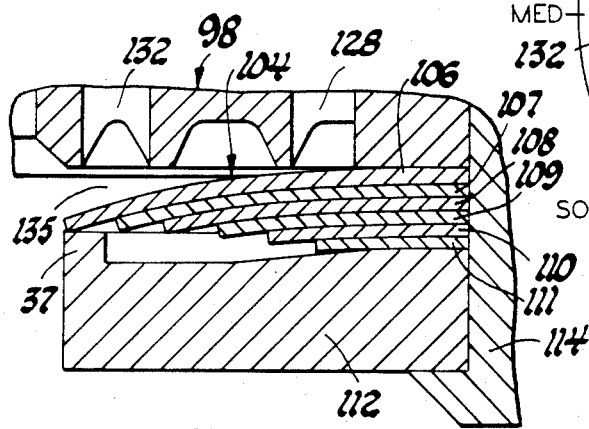
FIGS. 6 and 7 are fragment views showing a cross-sectional portion of a valve orifice plate and the spring plate disk pack to show the action thereof under certain conditions of operation which corresponds generally to the views of FIGS. 4 and 3 respectively.
Figure 7:
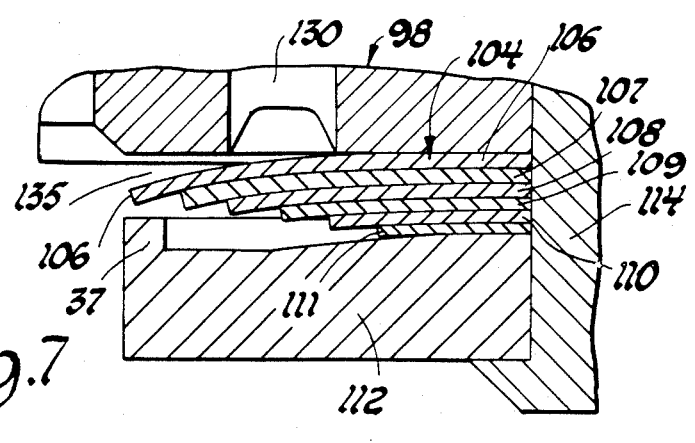

By rotating the selector plate to selected positions, various combinations of flow control orifices can be chosen to set the rebound damping characteristics of the shock absorber to meet the operator's requirements and demands. For example, if the selector plate is rotated to the FIG. 3 position in which selector plate openings or windows 126 uncover the orifice 130 in the orifice plate, damper oil can impinge on the spring disk pack to effect the degree of deflection as illustrated in FIG. 7 so that the shock absorber has a selected intermediate degree of spring damping. The opening or clearance 135 between the bottom of the orifice plate and the uppermost valve disk 106 acts in series with the open flow control orifice 130 to provide the restriction for flow control through the piston. In the event that the operator desires a softer ride, the damper plate is rotated clockwise or counterclockwise from the FIG. 3 position until windows 126 are aligned with orifices 128 and 132 and windows 124 are aligned with orifices 130 shown in FIG. 4—arrow A will be at the soft ride position. In this condition, all orifices are open and the sum of the forces of rebound fluid is moved further out on the lever arm provided by the plates of the disk pack. As illustrated in FIG. 6, the fluid forces on the valve disk pack are highest and the disk pack will be subjected to its greatest deflection on rebound stroke. Under such conditions with upper valve disk 106 grounding on annular wall 37 of backing plate 112, the flow through the piston valving is maximized so that the damping capability of the shock absorber is reduced and piston velocity on rebound stroke is increased and the ride is accordingly softer.

Figure 5:
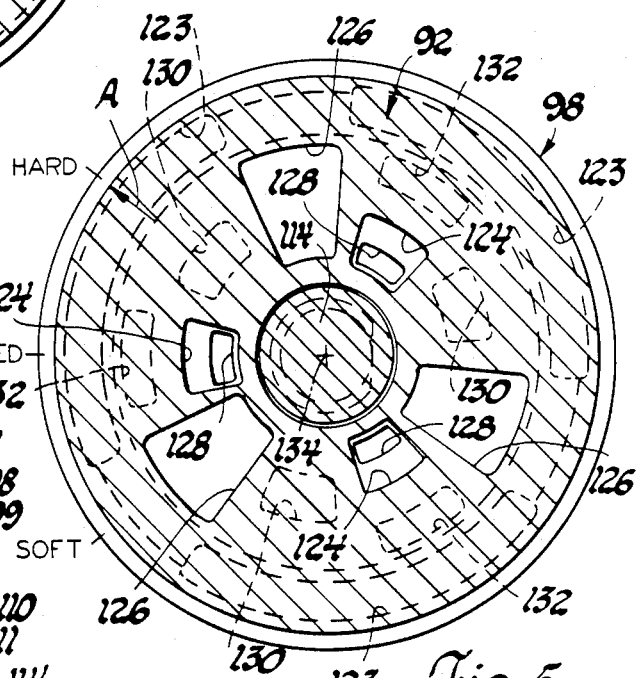

If a hard ride is desired the selector plate may be selectively rotated to the FIG. 5 position so that only orifices 128 are uncovered by windows 124—indicator arrow A is at the hard ride position. During rebound, flow through the windows 124 and orifices 128, will impinge on the spring plate pack closer to their center 134. Under such conditions, spring plate deflection is minimized and rebound valve restriction is highest. With high restriction, resistance to piston movement is increased. With this action, the suspension spring rate is in effect, increased so that the ride is harder.

Figure 8:
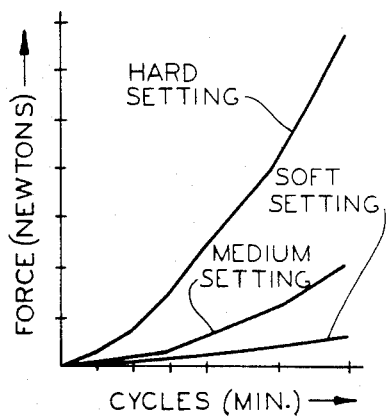
FIG. 8 is a graph illustrating operation of the invention.

FIG. 8 illustrates operation of the preferred embodiment of the invention shown in FIGS. 1-7 with the orifice size and disk pack 104 selected to provide high resistance (newtons) to piston movement for sports car rides, maximum resistance for standard operation and low resistance for highly cushioned boulevard rides.

On jounce or compression with the piston assembly moving downwardly, the fluid in the cylinder tube below the piston 28 will flow through the outer restricted passages 123 to force the orifice selector plate upwardly, deflecting wave spring 118. Fluid flowing through the piston and into the cylinder tube above the piston is heated by friction as it squeezed through restricted passages 123. By changing the energy of the transmitting fluid into heat, the movement of the suspension springs is controlled on jounce or compression stroke.

While this invention shows three sets of selected flow control orifices, additional sets can be provided so that flow rates through the piston on rebound can be further varied for further tailoring of shock absorber action.

The embodiments of the invention in which an exclusive property or privilege is claimed are defined as follows:

1. A deflected disk hydraulic damping unit for controlling the spring action of vehicle suspension springs comprising a cylinder tube having a hydraulic fluid therein, a valved piston mounted for linear jounce and rebound stroking movement in said cylinder tube and hydraulically separating said cylinder tube into first and second chambers, valve means in said piston for controlling the flow of hydraulic fluid between said chambers through said piston on rebound stroking movement, a piston rod extending from said piston to the exterior of said damping unit, an actuator rod extending within said piston rod, said valve means comprising a generally cylindrical orifice plate having upper and lower surfaces and having a plurality of separate and arcuately spaced rebound flow control orifices therethrough fixed in said piston, a first number of said orifices being spaced radially inward of a second number of said orifices, a selector plate mounted for linear movement relative to said orifice plate and for rotary movement about the longitudinal axis of said piston rod and further being mounted on the upper surface of said orifice plate, said selector plate having window means therethrough which by movement of said orifice selector plate to predetermined positions directs hydraulic fluid into predetermined combinations of said orifices, connector means operatively connecting said selector plate to said actuator rod for rotation thereby, and a plurality of deflectable valve disks fully covering and fully closing said flow control orifices when in an undeflected position, said disks being disposed adjacent to said lower surface of said orifice plate, said disks being secured at a centralized connection to said orifice plate and deflectable in response to hydraulic fluid forces directed only through said said first number of said orifices away from said lower surface of said orifice plate to thereby open and establish a flow passage therebetween and to control the rate of flow of fluid through said piston and thereby the rebound spring damping characteristics of said hydraulic damping unit and being further deflectable in response to hydraulic forces directed through both said first and second number of said orifices away from the lower surface of said orifice plate to thereby increase the size of said flow passage and accordingly decreasing the rebound spring damping characteristics of said hydraulic damping unit, said orifice plate having jounce flow control orifices therethrough separate from and radially outwardly of said rebound flow control orifice, and spring means for yieldably holding said selector plate for linar movement over said jounce flow orifice for jounce control.

2. A hydraulic damping unit for damping the spring action of vehicle suspension springs comprising a cylinder tube having a hydraulic fluid therein, a valved piston mounted for linear jounce and rebound stroking movement in said cylinder tube and hydraulically separating said cylinder tube into first and second variable volume chambers, valve means in said piston for controlling the flow of hydraulic fluid between said chambers through said piston, a piston rod extending from connection with said piston to the exterior of said damping unit, a rotatable actuator rod extending within said piston rod, said valving means comprising an orifice plate having a center and having a plurality of rebound flow controlling openings therein, said orifice plate being fixed in said piston, a first number of said openings being arcuately spaced from one another and disposed adjacent to said center, a second number of said openings being arcuately spaced from one another and radially outward of the first number of said openings in said orifice plate, a rotatable and linearly movable selector plate connected to said actuator rod and mounted on top of said orifice plate, said selector plate having window means therethrough which by rotary movement of said selector plate directs fluid into predetermined combinations of said openings, a plurality of defflectable valve disks secured at a central location to the bottom of said orifice plate to normally fully cover and close said set of rebound flow controlling openings, said valve disks being deflectable between first, second and third positions from said orifice plate in response to hydraulic forces determined by the selection of said first and said second numbers of said opening to form a selectively variable sized flow passage between said orifice plate and said disks to accordingly vary and control the rate of flow of fluid through said piston as said piston strokes in rebound direction and thereby vary and control the spring damping characteristics of said hydraulic damping unit, said orifice plate having discrete jounce flow control openings therethrough separate from said rebound flow control openings and spring means having said selector plate in blocking engagement with said jounce flow control openings on rebound stroking movement and allowing said selector plate to move linearly off of said orifice plate to allow hydraulic fluid to flow through said jounce openings on jounce stroking movement for jounce control.

* * * * *